United States Patent
Laguzzi

[15] 3,692,910
[45] Sept. 19, 1972

[54] BENZYLISOQUINOLINIC SOLUTIONS AND METHOD OF MAKING THE SAME

[72] Inventor: Umberto Laguzzi, Via Cadore 52, Milan, Italy

[22] Filed: Sept. 5, 1968

[21] Appl. No.: 757,800

[30] Foreign Application Priority Data

Sept. 7, 1967 Italy....................20249 A/67

[52] U.S. Cl. ...............424/258, 424/173, 252/363.5
[51] Int. Cl. ..............................................A61k 27/00
[58] Field of Search ............424/258, 173; 252/363.5

[56] References Cited

OTHER PUBLICATIONS

Remington's Pharmaceutical Sciences, 13th Ed. (1965), pp. 498–524.

Primary Examiner—Stanley J. Friedman
Attorney—Michael S. Striker

[57] ABSTRACT

Benzylisoquinolinic solutions and particularly injectable solutions are produced by forming an intimate mixture of appropriate proportions of benzylisoquinolinic compounds, aliphatic alkanol amines which serve as solubilizing agent, a buffer selected from salts of organic acids with alkanol amines or N-methylglucamine, and the proportion of water required to obtain the final solution of the desired concentration of the benzylisoquinolinic compound.

12 Claims, No Drawings

3,692,910

BENZYLISOQUINOLINIC SOLUTIONS AND METHOD OF MAKING THE SAME

BACKGROUND OF THE INVENTION

The solubilization of benzylisoquinolinic compounds represents an important problem particularly since it is frequently desirable to dissolve benzylisoquinolinic compounds so as to obtain injectable solutions thereof.

Several compounds belonging to the class or group of benzylisoquinolinic compounds and substituted in various ways are known which are almost insoluble in water but may be dissolved in certain organic solvents as well as in mineral and organic acids, in the latter case forming the respective salts which may be separated in dry condition. The benzylisoquinolinic compounds may be substituted in various ways, such as by carrying radicals or groups which are indifferent with respect to the intended use of the compound, or acidic or basic groups.

Particularly the salts which may be formed with acids are water-soluble inasmuch as being produced from weak bases and strong acids these salts are strongly hydrolized and the aqueous solutions formed thereof have a considerably low pH.

Such solutions, depending on the structural characteristics of the specific substituted benzylisoquionolinic compound and on the properties of the substituting groups, may be easily oxidized in a reversible or irreversible manner.

It is well known that solutions of very low pH are poorly adapted for parenteral administration and, consequently, attempts have been made to reduce the free acidity of such solutions, in other words to raise the pH value thereof by partial neutralization with organic or inorganic bases, or by further dilution of the solution. However, in both cases partial precipitation of the bases will occur resulting in a lowering of the concentration of the effective constituent, i.e., the substituted benzylisoquinoline in the solution. This results in reducing the pharmacological effectiveness of the solution or in actually making the solution ineffective.

Furthermore, benzylisoquinolinic compounds which were solubilized with the aid of organic or inorganic acids are poorly adapted for parenteral administration since these aqueous solutions practically always cause general or localized reactions, sometimes of very considerable extent, due to the hydrolytic effect thereof.

Similarly, injectable papaverin solutions are not free from causing undesirable localized reactions.

Such localized reactions may consist in severely histologically harmful and necrosing effects, whereas the undesirable general reactions are caused by the severe inactivation of the buffer systems and will result in damage to the functioning of the urinary system (alkalosis).

Quite obviously, non-aqueous solutions whether starting from the free bases or from the respective salts cannot be used effectively for parenteral administration because the bound acid as well as free acid would be released and cause most undesirable general and localized reactions in the affected tissue, as well as because of the chemical-biological properties of such solvents other than water which generally are pharmacologically undesirable.

It has been proposed to effect the solubilization of benzylisoquinolinic compounds which per se are insoluble or only slightly soluble in water, by using as the solubilizing agents lactic acid, phosphoric acid, acetic acid, propionic acid, hydrochloric acid sulfuric acid and the like.

In such systems, the molar ratios of solubilized base to solubilizing acid generally will be equal to or less than 1 and, consequently, the aqueous solutions will be strongly acid, so much so that parenteral administration is not indicated or at most only to a limited extent.

The benzylisoquinolinic compounds which are hydrosolubilized in acid and then separated in dry condition by evaporation of their alcoholic solutions show substantially the same behavior. As a matter of fact, such salts cannot be successively diluted or partially neutralized and thus their aqueous solutions remain of considerable acidity and their entire properties are such as to make parenteral administration thereof generally undesirable.

It may be concluded that up to now the solubilization of the benzylisoquinolinic molecules variously substituted with organic or inorganic acids, such as hydrochloric acid, sulfuric acid, phosphoric acid, acetic acid, succinic acid, fumaric acid, maleic acid, propionic acid and the like, does not permit the preparation of aqueous solutions suitable for parenteral administration, or at least, the aqueous solution obtainable by such techniques make parenteral administration extremely difficult, particularly in connection with prolonged treatments so that the use of such solutions is limited in view of their high concentration of free acidity on the one hand, or in case of greater solution, their somewhat low concentration of the effective dissolved agent.

It is therefore an object of the present invention to provide an effective method of producing solubilized solutions of benzylisoquinolinic compounds, which solutions lend themselves to parenteral administration. The present invention also contemplates as a new composition of matter the aqueous solutions containing as effective agent a benzylisoquinolinic compound, which solutions may be produced in accordance with the method of the present invention.

SUMMARY OF THE INVENTION

The present invention contemplates in a method of producing a solution of a benzylisoquinolinic compound, the step of forming an intimate mixture of (a) a benzylisoquinolinic compound, (b) an effective amount of at least one solubilizing agent selected from the group consisting of aliphatic alkanolamines, (c) a buffer selected from the group consisting of salts of organic acids with N-methyl-glucamine and salts of organic acids with alkanolamines, and (d) water in an amount sufficient to obtain in the thus-formed mixture the desired concentration of the benzylisoquinolinic compound.

Preferably, the mixture is formed in an inert gas atmosphere and at a temperature not exceeding about 20°C, most preferably at a temperature of between about 10° and 15°C. which only upon substantially complete solubilization may rise to about 20°C.

It is sometimes advisable to include in the solution an antioxidizing agent which is compatible with the benzylisoquinolinic compound and the buffer and the solubilizing agent.

Injectable solutions of the benzylisoquinolinic compound may be produced by proportioning the benzylisoquinolinic compound, the solubilizing agent, the buffer and the water in such a manner as to obtain a final concentration of between about 50 and 100 mg/ml of the benzylisoquinolinic compound, between about 5 and 10 mg/ml of the buffer, and between about 50 and 200 mg/ml, preferably between about 100 and 200 mg/ml of the solubilizing alkanol amine.

N-methylglucamine citrate is one of the prepared buffers. Preferably, the type and proportion of the buffer is so chosen as to obtain a solution having a pH of between 7.8 and 8.5 and most preferably between 7.8 and 8.

The organic acid of the buffer salt may advantageously be chosen from the group consisting of citric acid, tartaric acid, succinic acid, and maleic acid.

Preferred benzylisoquinolinic compounds which may be solubilized in accordance with the present invention include 1-(3,4dioxybenzyl)-6,7 dioxyisoquinoline and 1-(3,4-dibenzoyloxybenzyl)-6,7 dibenzoyloxyisoquinoline.

According to a preferred embodiment, the solubilizing agent, the buffer and the water are present in such proportions as to obtain a pH of between 7.8 and 8.5, a concentration of the benzylisoquinolinic compound of between 50 and 100 mg/ml, a concentration of the alkanol amine which serves as solubilizing agent of between 50 and 200 mg/ml, and the benzylisoquinolinic compound may be one of the two above-mentioned compounds, whereas the buffer comprises N-methylglucamine citrate, and the solubilizing agent is comprised of one or more of the following compounds:

$$NH_2-CH_2-CH_2OH, NH_2-CH_2-CH_2-CH_2OH$$

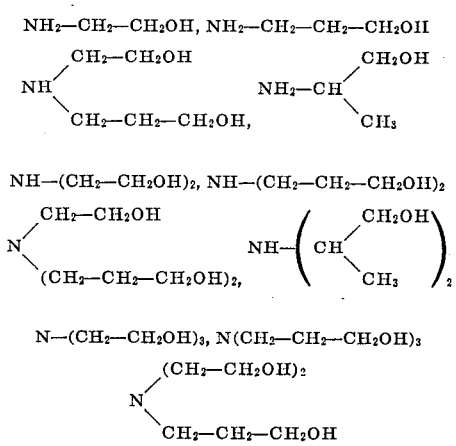

$$N-(CH_2-CH_2OH)_3, N(CH_2-CH_2-CH_2OH)_3$$

and

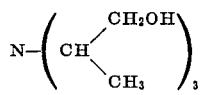

DESCRIPTION OF THE PREFERRED EMBODIMENTS

It is proposed according to the present invention to produce aqueous solutions of benzylisoquinolinic compounds which have a pH value approaching the physiological pH and a concentration which is desirable for parenteral administration. The solutions produced according to the present invention will not be subject to precipitation and/or oxidation phenomena, the latter being prevented, where necessary, by the incorporation of compatible anti-oxidizing agents. It is thus possible to administer the solutions of benzylisoquinolinic compounds which were prepared according to the present invention either intravenously or also by deep intramuscular administration.

It is well known and does not require detailed discussion, that certain benzylisoquinolinic compounds are particularly suitable for administration in the case of those syndromes in which a spasmolytic effect with central or peripheral significance and a hypotensive action, particularly with respect to the smaller vessels, is desired.

In many cases, parenteral administration of certain benzylisoquinolinic compounds is required for therapeutic purposes since frequently oral administration appears to be useless due to partial inactivation of the effective agent within the gastroenteric tract, and also because in case of emergency, when a quick or nearly immediate effect is desired, parenteral administration would not act with the required speed.

Without being limited thereto, the method of the present invention is particularly designed for the solubilization of molecules of a benzylisoquinolic structure such as polyhydroxybenzylisoquinolines, for instance papaverolin 1-(3,4-dihydroxybenzyl)-6,7-dihydroxyisoquinoline, their esters and ethers, such as, for instance, tetrabenzoic ester of papaverolin, accomplished with the use of moderate quantities of an alkanolamine.

The thus-obtained solutions can be diluted with water, the pH can be controlled by a buffer system resulting in substantial neutralization of free alkalinity, and the entire characteristics of the thus-obtained solution are such as to make the solution suitable for parenteral administration.

The following oxyalkylamines (alkanolamines) are particularly suitable for use as solubilizing agents in accordance with the present invention:

$$NH_2-CH_2-CH_2OH, NH_2-CH_2-CH_2-CH_2OH$$

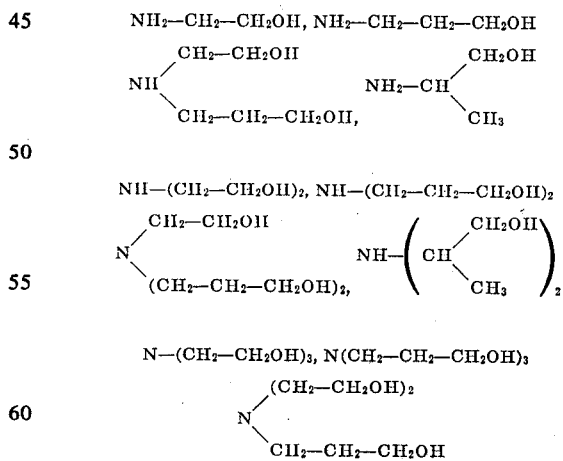

$$N-(CH_2-CH_2OH)_3, N(CH_2-CH_2-CH_2OH)_3$$

and

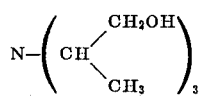

It is interesting to note that these oxyalkylamines (alkanolamines) have a very significant dissolving power with respect to the benzylisoquinolinic molecules, substantially unaffected by the nature, position and number of substituents in the molecule.

The alkylamines have solubilizing properties which are somewhat analogous to those of the oxyalkylamines or alkanol amines, but their effectiveness is much more limited and, furthermore, the alkyalmines would be responsible for the occurrence of ammonolysis and hydrolysis reactions. For these two reasons, their low effectiveness and the possibility of undesirable reactions as described above, the alkylamines are substantially less desirable than the oxyalkylamines or alkanolamines.

Mono-substituted oxyalkylamines possess superior solubilizing properties as compared with bi-substituted oxyalkylamines, and the latter are superior with respect to their solubilizing properties as compared with tri-substituted oxyalkylamines. Thus, ethanolamine has a solubilizing power superior to that of diethanolamine, and the latter, in turn, has a superior solubilizing power as compared with triethanolamine.

Extending the length of the oxyalkyl radical chain within certain limitations will impart to the molecule a greater solubilizing power. Thus, propanolamine is superior with respect to its solubilizing power for benzylisoquinolinic compounds as compared with ethanolamine and, consequently, also as compared with diethanolamine and triethanolamine.

Furthermore, it can be ascertained in the case of propranolamine that the increase in the number of oxyalkylsubstituents will reduce the solubilization effect with respect to benzylisoquinolinic molecules and, more specifically, it has been found that the solubilizing capacity of propanolamine is superior to that of dipropanolamine and the solubilizing power of the latter is superior to that of tri-propanolamine.

Furthermore, it has been found that in a given mono- or bi-substituted oxyalkylamine the substitution of residual hydrogen atoms with alkyl radicals, irrespective of the chain length, will reduce the solubilizing characteristics.

It should be noted that the solubilization of the benzylisoquinolinic molecules with the help of oxyalkylamines (alkanolamines) should be carried out with particular precautions. These solubilizing reactions are exothermic reactions which may lead to saponification and favor oxidation reactions unless the temperature is carefully controlled.

It is therefor important to carry out the solubilization under cooling and preferably in the presence of antioxidizing agents as well as in an inert gas atmosphere, preferably supplied in the form of an inert gas current.

The aqueous solution obtained by the reaction between oxyalkylamines and benzylisoquinolines may be adjusted to the desired concentration with water or by introduction of an aqueous buffer solution.

The preferred buffer systems are aqueous solutions of the citrate, tartarate and succinate of N-methylglucamine.

The following examples are given as illustrative only without, however, limiting the invention to the specific details of the examples.

EXAMPLE 1

A five-neck flask having a capacity of 3,000 ml and provided with a cooling system is arranged with agitator, thermometer, loading funnel provided with a screw conveyor, tap funnel and tubing for the admission of nitrogen.

Into the thus-equipped flask are introduced 240 g ethanolamine, 1.2 g butylhydroxyanol (as an antioxidizing agent) or another antioxidizing agent. A nitrogen current is caused to pass for 10–15 minutes through at the flask and then while continuing the nitrogen current, the introduction of 120 g of the tetrabenzoylate derivative is slowly started through the loading funnel. The introduction is carried out under agitation and cooling so that the temperature of the mixture will not exceed between 10° and 15°C.

Once all of the substance which is to be solubilized has been introduced, the apparatus is still kept running until total dissolution is achieved, and during the entire time the nitrogen current is maintained. After achieving dissolution, 400 ml of a previously deaerated buffer solution is introduced through the tap funnel. This buffer solution has the following composition: 4 g of monohydrated citric acid, 7.45 g N-methylglucamine, and an amount of water sufficient to make up a total of 400 ml.

After introduction of this buffer solution, water is added until a total volume of 2,400 ml is obtained.

The thus-prepared solution is sucked into a metal container having a capacity of 5,000 ml and filtered through a sterilizing and depyrogenating filter under nitrogen pressure. Thereafter, the solution may be packed into ampoules and the latter should be sealed while in a nitrogen current.

EXAMPLE 2

Two hundred and forty g ethanolamine and a suitable antioxidizer, for instance 1.2 g butylhydroxyanisol are introduced into the apparatus described in Example 1.

A nitrogen current is caused to pass for 10–15 minutes through the apparatus and thereafter the slow introduction of 145 g of the polyhydroxybenzyl derivative of benzylisoquinoline (papaverolin) is started. Care is taken again to operate with agitation and to check the temperature which should not exceed between 10° and 15° C, and also to maintain a constant nitrogen current.

Once the entire amount of the papaverolin is introduced, 400 ml of a previously deaerated buffer solution is introduced into the reaction mixture. The buffer solution consists of 4 g monohydrated citric acid, 2.35 g ethanolamine and the amount of water required to make up 400 ml. Thereafter, distilled water is introduced until a total volume of 2,400 ml is reached in the flask.

The thus-prepared solution is sucked into a metal container having a capacity of 5,000 ml and filtered through sterilizing and depyrogenating filters under nitrogen pressure. The filtered solution is then introduced into ampoules which are sealed in a nitrogen current.

EXAMPLE 3

Again, the apparatus described in Example 1 is used. One hundred and twenty g ethanolamine and 140 g diethanolamine are introduced into the flask together with 1.3 g of nordihydroguaiantico (as antioxidizing agent). Again a nitrogen current is caused to pass through the apparatus for 10–15 minutes and thereafter the slow introduction of 120 grams of the tetrabenzoylate derivative of benzylisoquinoline is started. The introduction is carried out under agitation and at a temperature not exceeding 10°–15° C while maintaining the nitrogen current.

After the entire quantity of the tetrabenzoylate derivative has been introduced, the apparatus is kept running with passage of nitrogen therethrough until the dissolution is completed. After complete dissolution, 400 ml of a previously deaerated buffer solution consisting of 4 g monohydrated citric acid, 4.1 g diethanolamine and the amount of water required to make up 400 ml, are introduced and finally distilled water is added to make up a total of 2,400 ml. The thus-obtained aqueous solution is then subjected to filtration, sterilization, depyrogenation and filling into ampoules as previously described.

EXAMPLE 4

Again the apparatus described in Example 1 is used, according to the present example for first introducing 60 g ethanolamine, 140 g diethanolamine, 160 g triethanolamine and 0.8 g propylgallate, the latter serving as antioxidizing agent. A nitrogen current is caused to pass through the apparatus for 10–15 minutes and thereafter the slow introduction (through the loading funnel) of 60 g of the tetrabenzoylate derivative of benzylisoquinoline and of 72.5 g of the polyhydroxybenzyl derivative (papaverolin) are started and care is again taken to maintain agitation and to keep the temperature at a level not exceeding 1 10°–15° C as well as of continuously passing a nitrogen current through the apparatus.

After the entire mixture of derivatives which are to be solubilized has been introduced, the apparatus is kept running until total dissolution is accomplished and during this entire time, in fact until the final product is filled into ampoules, a nitrogen atmosphere is maintained. After achieving total dissolution, 800 ml of a buffer solution consisting of 8 g monohydrated citric acid, 2.35 g ethanolamine, 4.1 g diethanolamine and the amount of water required to make up 800 ml are introduced. Finally, distilled water is added to make up a total of 2,400 ml. The thus-obtained solution is then subjected to filtration, sterilization, depyrogenation and filling into ampoules as previously described.

EXAMPLE 5

In the previously described apparatus are introduced 140 g diethanolamine, 160 g triethanolamine, 76 g propanolamine and 0.65 g nordihydroguaiantico and 0.40 g propylgallate, the last two mentioned compounds serving as antioxidizing agents. A nitrogen current is maintained for 10–15 minutes and thereafter the slow introduction, through the loading funnel, of 50 g of the tetrabenzoylate derivative of benzylisoquinoline and of 72.5 g of polyhydroxybenzyl derivative (papaverolin) is started while care is being taken to operate under agitation within a temperature range not exceeding 10°–15° C and also in a nitrogen current.

Once the entire amount of the benzylisoquinolinic compounds has been introduced and dissolved, the apparatus is kept running while through the tap funnel 1,200 g of a buffer solution consisting of 12 g monohydrate citric acid, 2.5 g propanolamine, 4.8 g triethanolamine, 7.45 g N-methylglucamine and the amount of water required to make up 1,200 ml are introduced. Finally, additional distilled water is added to make up a total of 2,400 ml Filtration, sterilization, depyrogenation and filling into ampoules of the thus-obtained solution is carried out as described further above.

What is claimed as new and desired to be protected by Letters Patent is set forth in the appended claims:

1. The method for preparing an aqueous solution of polyhydroxybenzylisoquinoline or an ester thereof which comprises adding (a) a member selected from the group consisting of polyhydroxybenzylisoquinoline and its esters to (b) an aliphatic alkanolamine selected from the group consisting of

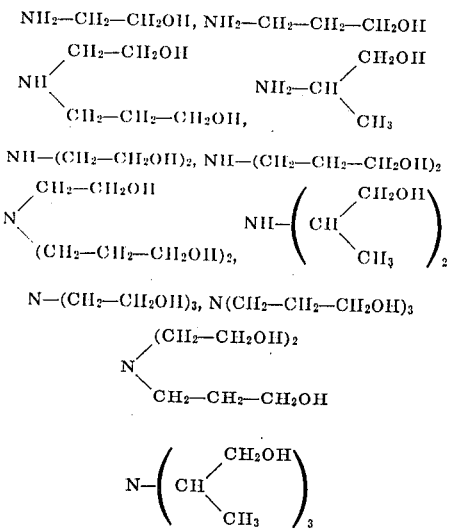

and at a temperature of from about 10° to about 20° C and in the presence of an inert gas, thereafter adding to the solution thereby formed (c) a member selected from the group consisting of a salt of N-methylglucamine with an organic acid and a salt of an alkanolamine as set out under (b) with an organic acid in the form of its aqueous solution as buffer for said aqueous solution of (a) in (b) thusly obtained wherein said polyhydroxybenzylisoquinonoline group member (a) is present in an amount of 50–100 mg/ml, said alkanolamine group member (6) is present in an amount of 50–200 mg/ml and said last-mentioned group member (c) is present in an amount of f 5–10 mg/ml.

2. The method of claim 1 wherein said member (c) is added in an amount whereby said aqueous solution is a pH of from 7.8–8.5.

3. The method of claim 1 wherein said member (b) additionally contains an anti-oxidant.

4. A composition comprising an aqueous solution of polyhydroxybenzylisoquinoline or an ester thereof produced by the process of claim 1.

5. A composition according to claim 4 additionally containing an anti-oxidant.

6. A composition according to claim 5 wherein said anti-oxidant is at least one member selected from the group consisting of butylhydroxyanisol, nor-dihydroguaiantico and propylgallate.

7. A composition according to claim 4 wherein said member (c) is a salt with an organic acid selected from the group consisting of citric acid, tartaric acid, succinic acid and maleic acid.

8. A composition according to claim 7 wherein said member (c) is N-methylglucamine citrate.

9. A composition according to claim 4 wherein said aqueous solution has a pH of between 7.8 and 8.5.

10. A composition according to claim 4 wherein said member (b) is present in an amount of 100–200 mg/ml.

11. A composition according to claim 4 wherein said polyhydroxybenzylisoquinoline is a member selected from the group consisting of 1-(3,4 dioxybenzyl)-6,7 dioxyisoquinoline and 1-(3,4 dibenzoyloxybenzyl)-6,7 dibenzoyloxyisoquinoline.

12. A pharmaceutical injectible solution comprising a composition according to claim 4 in dosage unit form.

* * * * *